July 26, 1955     E. J. HUCKSHOLD     2,713,993
MINING BITS
Filed April 9, 1951
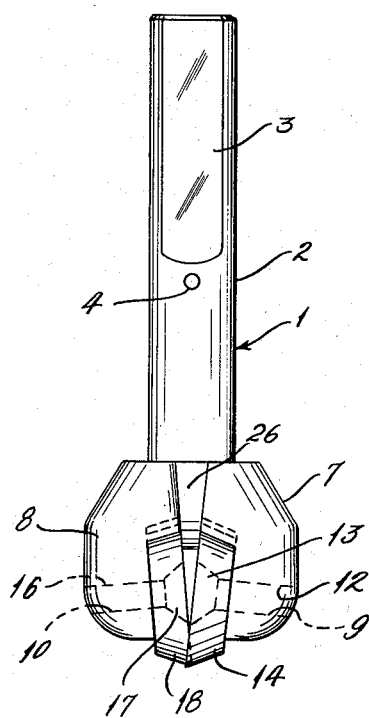
FIG.1.
FIG.5.
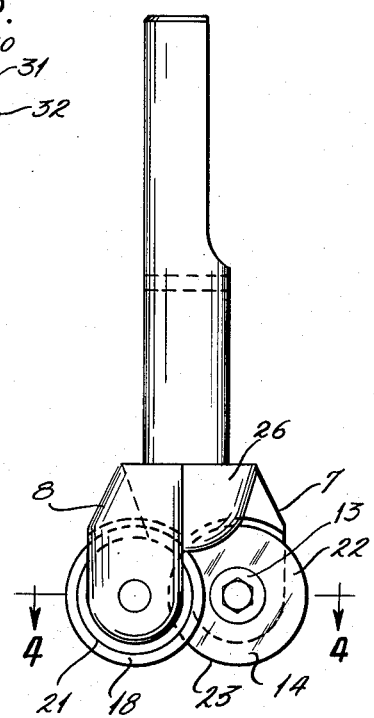
FIG.2.
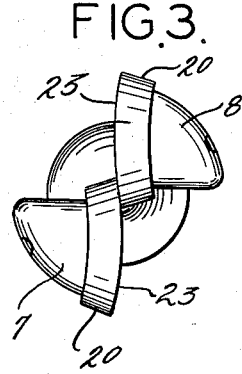
FIG.3.
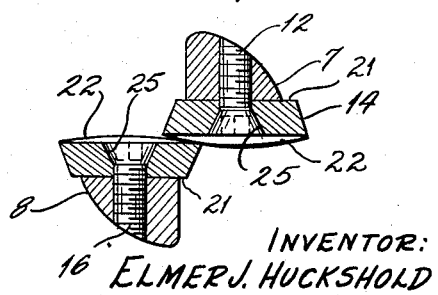
FIG.4.
INVENTOR:
ELMER J. HUCKSHOLD
By *Burrings and Sutherland*
ATTORNEYS.

United States Patent Office 2,713,993
Patented July 26, 1955

2,713,993

MINING BITS

Elmer J. Huckshold, St. Louis, Mo., assignor to Central Mine Equipment Company, St. Louis, Mo., a corporation of Missouri Application April 9, 1951, Serial No. 219,982

1 Claim. (Cl. 255—324)

This invention relates generally to rotating mining drills and particularly to drills having branched cutting heads.

Mining drills with branched cutting heads are well known to the art. Bits for use in mining drills with branched cutting heads known heretofore have generally been sharp-pointed and outwardly pointed, cutting a relatively large hole but producing a central core. In those cutting heads which were equipped with removable bits, the entire bit had to be removed for sharpening when the bit was dull and for replacement when the bit was broken. The pointed bits of the prior art have dulled quickly, have been subject to breakage along their unsupported outer edges and have had a tendency to chatter and "walk" as the points engage the coal or rock being drilled.

One of the objects of this invention is to provide a mining drill requiring less power than drills of the prior art to operate, which is smooth running, is adjustable so as to be capable of long use before the bits need to be replaced, is self-sharpening, non-chipping and non-coring. Other objects will become apparent to those skilled in the art, in the light of the following description with the accompanying drawings.

In accordance with this invention, generally stated, a mining drill is provided having a branched cutting head, each of the branches of which is provided with a bit in the form of a disk of substantial width, one edge of which forms the cutting edge of the cutting head. The disks are arranged to overlap so as to be non-coring. They may be made of high speed steel, tungsten carbide, alloy steel, hard-faced steel (mild or alloy), or the like.

In the drawings:

Figure 1 is a view in side elevation of one embodiment of cutting head constructed in accordance with this invention;

Figure 2 is a view in front elevation of the embodiment shown in Figure 1;

Figure 3 is a bottom plan view of the device shown in Figure 1;

Figure 4 is a sectional view taken along the line 4—4 of Figure 2; and

Figure 5 is a view in perspective of another embodiment of bit for use with the cutting head of this invention.

Referring now to the drawing, 1 represents a cutting head for use with a spiral mining drill. The cutting head 1 is provided with a shank 2 for insertion in a drill stem not here shown. The shank 2 is flattened at 3 to engage a chord within the drill stem to prevent relative movement of the drill stem and cutting head when the drill is in use. A hole 4 in the shank 2 is adapted to be aligned with a corresponding hole in the drill stem to take a pin as is usual in such assemblies. Fixed to the shaft 2—ordinarily integral therewith—are a pair of arms 7 and 8. Arm 7 is drilled and tapped as indicated at 9. Arm 8 is drilled and tapped as indicated at 10. Mounted on arm 7, by means of a stud 12 having a tapered recessed head 13, is a disk 14. Mounted on arm 8, by means of a stud 16 having a tapered recessed head 17, is a disk 18. Disks 14 and 18 may be identical. Each disk is of substantial thickness to produce a side 20. The sides 20 are beveled so that the back faces 21 of the disks are of less diameter than the front faces 22. The edge resulting at the intersection of the front face 22 and the beveled side 20 forms the cutting edge 23 of the disks. Each of the disks is bored to produce a tapered hole 25 of such dimensions that the tightening of the stud 12 or 16 fixes the disks against rotation while the drill is in use.

In the embodiment shown, the disks are inclined toward the axis of the drill in the direction away from the drill, as shown particularly in Figure 1, and are in opposed overlapped relationship to one another across the axis of the drill, as shown in Figures 2, 3 and 4. The front faces 22 of the disks are positioned closely adjacent one another in the area in which they overlap, but diverge toward the shank upon opposite sides of a disc-retaining portion 26 which projects from the shank so that the front face of each disc is overlapped thereby and bears thereon. At a part of the overlapped area of the disks remote from the portion 26 of the shank, the front faces 22 of the disks bear on one another, as is shown in Figures 1, 3 and 4.

In the embodiment shown in Figure 5, the side 30 of the disk is notched, as indicated at 31, to provide a serrate cutting edge 32 at the intersection of the front face with the side 30.

In operation of the embodiment shown in Figures 1–4, the disks 14 and 18 are fastened to the arms 7 and 8 respectively by studs 12 and 16. Drilling with the cutting head of this invention is performed in the manner common to such rotating spiral drills. However, it has been found that the cutting of the disks is substantially vibrationless, which may be due to the relatively large bearing surface provided. At the same time, wear on the cutting edges of the disks is relatively slight, with practically no chipping or breakage. This is probably due to the fact that the edges, as can be seen from Figures 1 and 4, are well and uniformly supported. The disks are, in fact, found to be self-sharpening since the abrasive action of the material being drilled acts to grind the side 20 and so to maintain a sharp edge at the intersection of that side with the front face 22 of the disks. This is particularly marked since the disks incline toward the axis so that the abrasion of the material being drilled tends to grind the side 20 at an acute angle with the front face 22.

When the exposed edges of the disks become worn down, it is only necessary to loosen the studs 12 and 16, rotate the disks to expose unworn portions of the edges, and retighten the studs. Thus it can be seen that one set of disks is equivalent to several sets of replaceable bits of the character known heretofore.

A disk may be replaced by removing its stud. Thus, either or both of the disks may be replaced while the cutting head is in place on the drill stem.

The operation of the disks shown in Figure 5 is similar to that of the embodiment already described. The self-sharpening feature is, of course, not so pronounced, though still present, and the resistance to chipping is somewhat lower but for some types of drilling, this form of disk is highly desirable.

In either embodiment, when the disks overlap, no core is produced since a cutting edge extends completely across the cutting head. In spite of this fact, it has been found that less power is required to operate a drill with a cutting head constructed in accordance with this invention than is necessary to drive the coring drills of the prior art.

The disks may be made of high speed steel, tungsten carbide, alloy steel, hard faced mild or alloy steel, or the like. It can be seen that other means for mounting the disks may be employed such, for example, as studs secured to the rear faces of the disks and bolted to the arms 7 and 8. However, the arrangement of the embodiment shown is simple and effective, requiring only an Allen wrench to loosen or remove the disks.

Numerous other variations in the construction of the device within the scope of the specification and claim will be apparent to those skilled in the art in the light of the foregoing description. For example, while the disks are preferably overlapped, the amount of their overlapping may be varied. So, also, the form of serrations along the cutting edge may be varied to include, for example, a wave-like configuration.

Thus it can be seen that the invention accomplishes its objects and provides a simple, sturdy, efficient cutting head for a rotary mining drill.

Having thus described the invention, that which is claimed and desired to be secured by Letters Patent is:

In a rotary cutting head of the type having a shank, a pair of axially-offset arms projecting from said shank and a pair of generally circular bits adjustably secured to said arms, said bits having front and rear faces; the improvement comprising said bits being fixed with their rear faces seated against said arms and with generally exposed front faces is opposed, overlapped and closely adjacent relationship to one another, said front faces also being divergent from one another in the direction toward said shank, and means adjacent said shank extending partially across said front faces of the bits, said front faces bearing on said means and, at a part of their overlapped area remote from said means, on one another.

References Cited in the file of this patent

UNITED STATES PATENTS

| | | |
|---|---|---|
| 318,994 | Lake | June 2, 1885 |
| 1,029,491 | Cortinas | June 11, 1912 |
| 1,604,555 | Holland | Oct. 26, 1926 |
| 1,657,610 | Crickmer et al. | Jan. 31, 1928 |
| 1,681,651 | Woodruff | Aug. 21, 1928 |
| 1,685,327 | Kammerer | Sept. 25, 1928 |
| 1,719,546 | Hallett | July 2, 1929 |
| 2,238,199 | Whalen | Apr. 15, 1941 |
| 2,310,289 | Hokanson | Feb. 9, 1943 |